United States Patent
Kaufmann et al.

(10) Patent No.: US 10,799,823 B2
(45) Date of Patent: Oct. 13, 2020

(54) HOUSING MAIN PART OF A FILTER HOUSING, FILTER SYSTEM, AND PRE-SEPARATOR MODULE OF A FILTER SYSTEM

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 459 days.

(21) Appl. No.: 15/647,622

(22) Filed: Jul. 12, 2017

(65) Prior Publication Data

US 2017/0304760 A1    Oct. 26, 2017

Related U.S. Application Data

(63) Continuation of application No. PCT/EP2015/063556, filed on Jun. 17, 2015.

(51) Int. Cl.
*B01D 46/00* (2006.01)
*B01D 50/00* (2006.01)

(52) U.S. Cl.
CPC ..... *B01D 46/0013* (2013.01); *B01D 46/0002* (2013.01); *B01D 46/0004* (2013.01); *B01D 46/0005* (2013.01); *B01D 46/0008* (2013.01); *B01D 46/0023* (2013.01); *B01D 46/0024* (2013.01); *B01D 50/002* (2013.01)

(58) Field of Classification Search
CPC ............ B01D 46/0002; B01D 46/0004; B01D 46/0005; B01D 46/0008; B01D 46/0013; B01D 46/0023; B01D 46/0024; B01D 50/002
USPC .............. 55/490, 497, 498, 502, 521, 385.3; 123/198 E
See application file for complete search history.

(56) References Cited

U.S. PATENT DOCUMENTS

| | | | |
|---|---|---|---|
| 9,970,394 B2* | 5/2018 | Merritt | B01D 46/0023 |
| 2007/0227362 A1 | 10/2007 | Parker | |
| 2007/0234903 A1* | 10/2007 | Xu | B01D 45/16 95/267 |

(Continued)

FOREIGN PATENT DOCUMENTS

DE    102006004723 A1    8/2006

*Primary Examiner* — Minh Chau T Pham
(74) *Attorney, Agent, or Firm* — James Hasselbeck

(57) ABSTRACT

A housing main part of a filter housing has an element receiving space and an adapter chamber. A filter element is inserted into or removed from the element receiving space through a lateral mounting opening. A pre-separator module and the filter element are arranged behind each other along the main flow axis of the fluid to separate an outlet from an inlet of the filter housing. The adapter chamber accommodates the pre-separator module and/or the filter element. The adapter chamber is arranged at an axial end face of the housing main part and is open axially toward the element receiving space and, axially opposed thereto, toward the environment. The mounting opening is surrounded by a cover receiving rim that extends across the adapter chamber. A part of a connecting device within the housing main part is used to attach the pre-separator module to the housing main part.

9 Claims, 7 Drawing Sheets

(56) References Cited

U.S. PATENT DOCUMENTS

2010/0186353 A1\* 7/2010 Ackermann ....... B01D 46/0021
 55/321
2010/0267540 A1 10/2010 Babb et al.

\* cited by examiner

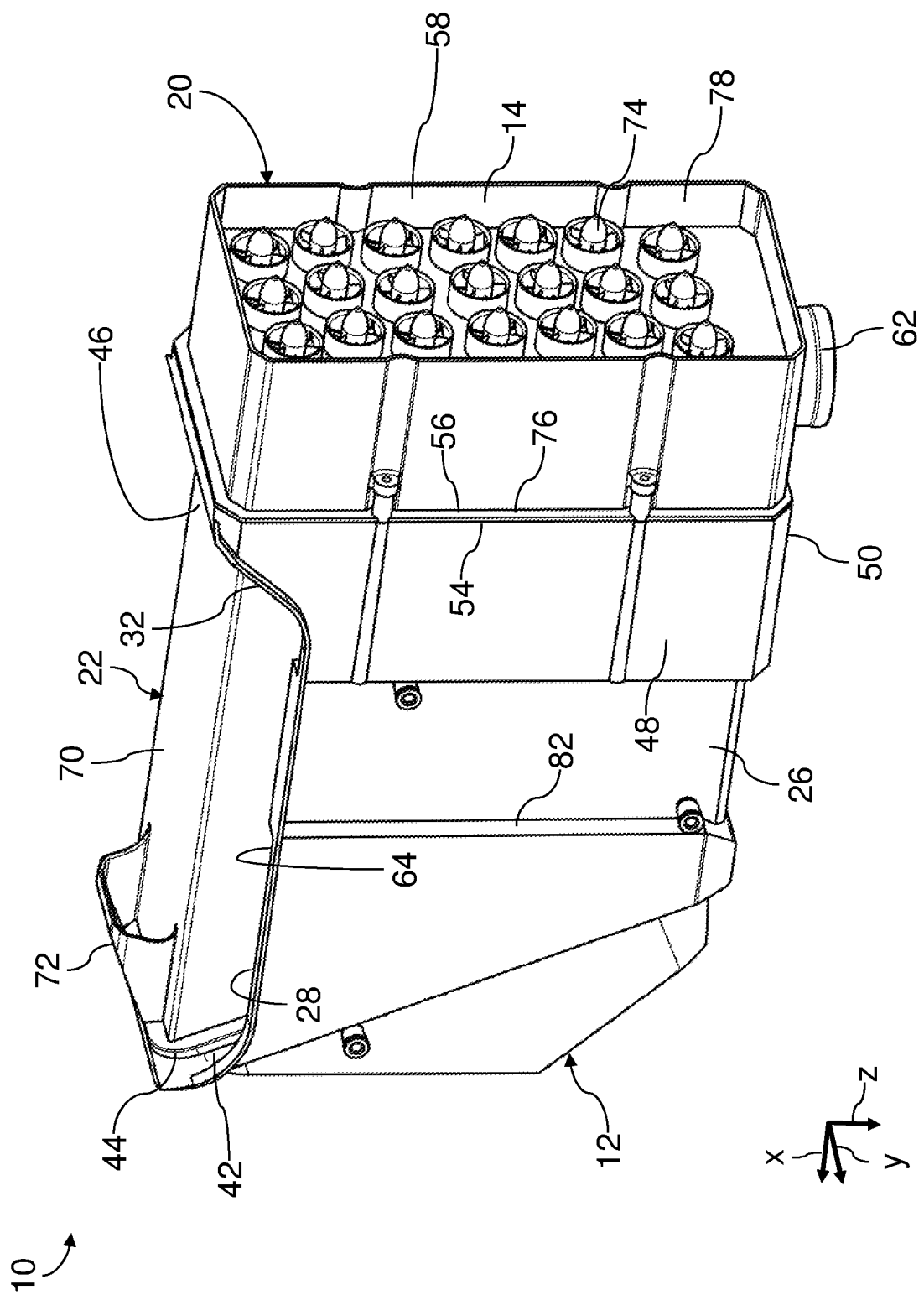

HOUSING MAIN PART OF A FILTER HOUSING, FILTER SYSTEM, AND PRE-SEPARATOR MODULE OF A FILTER SYSTEM

CROSS-REFERENCE TO RELATED APPLICATIONS

This application is a continuation application of international application No. PCT/EP2015/063556 having an international filing date of 17 Jun. 2015 and designating the United States, the international application claiming a priority date of 14 Jan. 2015, based on prior filed United States provisional patent application No. 62/103,217, the entire contents of the aforesaid international application and the aforesaid United States patent application being incorporated herein by reference.

BACKGROUND OF THE INVENTION

The invention concerns a housing main part of a filter housing of a filter system, in particular of a modularly configured filter system, for filtration of gaseous fluid, in particular air, in particular of an internal combustion engine, in particular of a motor vehicle, of a construction or agricultural machine and/or of a compressor.

Moreover, the invention concerns a filter system, in particular a modularly configured filter system, for filtration of gaseous fluid, in particular air, in particular of an internal combustion engine, in particular of a motor vehicle, of a construction or agricultural machine and/or of a compressor.

Moreover, the invention concerns a pre-separator module of a filter system, in particular of a modularly configured filter system, for filtration of gaseous fluid, in particular air, in particular of an internal combustion engine, in particular of a motor vehicle, of a construction or agricultural machine and/or of a compressor.

US 2004/0221555 A1 discloses an air filter that is designed for linear flow therethrough. The air filter comprises a filter cartridge that can be separated from the rest of the air filter and exchanged. The air filter comprises a housing that usually comprises a right-angled cross-section. The housing comprises sidewalls which define opposed sides, opposed cover and bottom plates, and opposed inlet and outlet ends. The cover corresponds to a sidewall that can be opened by removal of an access or service lid.

SUMMARY OF THE INVENTION

It is the object of the invention to design a filter system, a filter housing, and a pre-separator housing of the aforementioned kind in which several purification stages for purifying the gaseous fluid can be realized simply, space-savingly, and as flexible as possible.

This object is solved according to the invention in that the housing main part comprises at least one outlet for filtered fluid, in that at least one pre-separator module and at least one exchangeable filter element can be arranged behind each other along a main flow axis of the fluid to be filtered in/on the housing main part in such a way that they separate the at least one outlet from at least one inlet of the filter housing for the fluid to be filtered, wherein the at least one inlet can be formed at least partially by the at least one pre-separator module, wherein the housing main part relative to the main flow axis comprises laterally at least one mounting opening closable by a housing cover, through which the at least one filter element can be installed in an element receiving space of the housing main part and removed therefrom, and wherein the housing main part on an end face that is axial relative to the main flow axis comprises an adapter chamber that, relative to the main flow axis, is open in axial direction toward the element receiving space and, axially opposite thereto, toward the environment, and on or in which the at least one pre-separator module and/or at least one filter element can be arranged at least partially, wherein the housing main part comprises at least one cover receiving rim that surrounds the mounting opening and extends across at least a portion of the adapter chamber, and wherein the housing main part in the area of or within the adapter chamber comprises at least one part of a connecting device for connecting the at least one pre-separator module.

According to the invention, the housing main part in an extension of the element receiving space comprises an adapter chamber in which optionally at least a portion of at least one filter element can be arranged, which, as a result of its axial extension relative to the main flow axis, does not fit completely into the element receiving space. The at least one pre-separator module accordingly can be arranged at least partially or completely outside of the adapter chamber. Alternatively, the housing main part can also be used for receiving a correspondingly shorter filter element. The free area of the adapter chamber that is available in this case can then be used without complex modifications, preferably entirely without modification, of the housing main part and/or of the at least one pre-separator module for receiving at least a portion of the at least one pre-separator module. In this way, the filter system can be configured flexibly in a modular way and adapted to corresponding requirements. Possibly required modifications can be taken into consideration already during manufacture of the housing main part and/or of the pre-separator module. Alternatively, the housing main part and/or the pre-separator module can be adapted appropriately, in particular in a modular way, prior to assembly.

As a whole, the filter system can be configured of a modular construction. Advantageously, housing cover, housing main part and/or pre-separator module of the same or at least similar configuration, respectively, can be combined with each other flexibly in order to realize filter systems with differently sized filter elements. In this way, manufacturing expenditure, in particular expenditure in regard to required manufacturing tools and/or molding tools for the housing main part and/or the pre-separator module, can be reduced.

For realizing the housing main parts according to the invention for differently sized filter elements, mostly the same, in particular identical, molding tools can be used. Preferably, it can be sufficient to exchange interchangeable inserts in order to configure the housing main parts for use in connection with differently sized filter elements.

The at least one pre-separator module, in the mounted filter system, is fluidically upstream of the at least one filter element. The at least one pre-separator module serves for separation of coarse particles, in particular dust, and/or water from the gaseous fluid before the latter reaches the at least one filter element. The gaseous fluid to be filtered is purified in this way in several stages. Accordingly, a degree of separation of dirt and the purification of the fluid can be improved. Moreover, the service life for the at least one filter element can be extended in this way. The filter system according to the invention can also be used under conditions of use in which the gaseous fluid, in particular air, is loaded particularly strongly with particles and dirt, as is particularly the case in agricultural operation or on construction sites.

The filter system is designed as a linear or so-called inline filter system. A main flow of the fluid to be filtered through the filter system extends substantially straight along the main flow axis. The adapter chamber and the element receiving space are accordingly arranged axially behind each other relative to the main flow axis. Accordingly, the at least one filter element and the at least one pre-separator module are also arranged behind each other along the main flow axis.

The housing main part comprises at least one mounting opening through which at least one filter element can be introduced into and removed from the filter housing. The at least one mounting opening is closeable by an appropriate housing cover. The at least one mounting opening is located in a lateral wall relative to the main flow axis, in particular in a cover side, of the housing main part. A main mounting direction of the at least one filter element into the element receiving space of the housing main part or a main removal direction therefrom is accordingly transverse, slanted or perpendicular to the main flow axis. The at least one filter element can be mounted or dismounted by means of a straight movement and/or by means of a pivoting, tilting and/or rotational movement.

The at least one mounting opening is surrounded by a cover receiving rim. On or at the cover receiving rim, the housing cover, in particular an appropriate cover rim of the housing cover, can be arranged, in particularly seal-tightly. Advantageously, the cover receiving rim can surround the mounting opening continuously in circumferential direction.

The cover receiving rim extends at least partially across one side of the adapter chamber. In this way, the housing cover can also cover a portion of the adapter chamber. Accordingly, the mounting opening can be designed to be correspondingly large in order to be able to position, through it, even larger filter elements in the housing main part, in particular in the element interior, and in the adapter chamber, if necessary. The mounting opening can also make accessible a portion of the adapter chamber. In this way, the installation of a correspondingly large filter element is simplified which can extend into the adapter chamber. Since the cover receiving rim extends across the adapter chamber, the same housing cover can be used for all configurations of the housing main part of the filter system according to the invention.

The adapter chamber is located at an axial end face of the housing main part relative to the main flow axis. By means of the adapter chamber, a connection of the housing main part with the pre-separator module is adapted as a function of the size of the employed at least one filter element. The adapter chamber is fluidically arranged upstream of the element receiving space.

The adapter chamber can advantageously be open at an end face which, relative to the main flow axis, is facing axially the environment and/or an end face which is facing axially the element receiving space. Though the appropriate open end faces, the at least one filter element, on the one hand, and the at least one pre-separator module, on the other hand, can be introduced into the adapter chamber.

Advantageously, the adapter chamber can have an inner width transverse to the main flow axis that is greater than the corresponding outer dimension of the at least one filter element, at least on its side which is facing the adapter chamber. Additionally or alternatively, the inner width of the adapter chamber can be greater than the corresponding outer dimension of the pre-separator module, in particular a pre-separator housing, at least in an area which comprises an axial end face of the pre-separator module relative to the main flow axis. In this way, the inner width of the adapter chamber enables receiving at least one portion of the at least one filter element and/or at least one portion of the pre-separator module. In this context, the at least one filter element can project from the element receiving space at least partially into the adapter chamber. Alternatively or additionally, the pre-separator module, in particular the pre-separator housing, can project from the axially opposed side at least partially into the adapter chamber. Accordingly, the adapter chamber, depending on the employed filter element and/or employed pre-separator module, can be utilized as completely as possible.

Advantageously, the element interior and the adapter chamber can comprise, transverse to the main flow axis, a similar cross-section, in particular a similar inner width. In this way, the housing main part can be produced, particularly removed from the mold, more easily.

The pre-separator housing can form at least partially the filter housing together with the housing main part and the housing cover. The inlet for the fluid to be filtered can be realized at the pre-separator housing.

The at least one pre-separator module can advantageously be moved in axial or parallel direction relative to the main flow axis into or onto the adapter chamber. The installation/attachment direction of the at least one pre-separator module can advantageously be perpendicular to the installation/dismounting direction of the at least one filter element relative to the housing main part.

According to the invention, the housing main part in the area of or within the adapter chamber comprises at least one part of a connecting device for connecting, in particular attachment, fixation and/or positioning, of the at least one pre-separator module. Advantageously, the at least one pre-separator module may comprise at least one separator-associated part connectable with this part of the connecting device. Advantageously, the connecting device can connect the at least one pre-separator module seal-tightly with the housing main part. For this purpose, the connecting device may comprise at least one sealing element, in particular a sealing surface and/or a seal.

The at least one pre-separator module can be connected by means of the connecting device detachably or non-detachably with the housing main part. Advantageously, the at least one pre-separator housing can be connected, indirectly or directly, to the housing main part by means of at least one material-fused and/or form-fit and/or friction connection, in particular by means of screws and/or clamps, a form fit, a plug-in connection, an adhesive connection, a welded connection, a soldered connection, a clamping connection, a locking connection, a rotary/plug-in connection, in particular a screw connection and/or a bayonet-type connection, or the like or a combination of several connecting types.

Advantageously, the housing main part and/or the pre-separator module, in particular the pre-separator housing, can be realized at least partially with plastic material, in particular from plastic material. The housing main part and/or the pre-separator module can advantageously be injection-molded or cast at least partially from/with plastic material or produced according to another plastic forming method. A large part of the tools, in particular forming tools, required for forming the housing main part and/or the pre-separator module can be retained for realizing various configurations of the filter system.

The at least one pre-separator module can advantageously comprise at least one cyclone block or can be such a cyclone block. The at least one pre-separator module may comprise a plurality of pre-separator cells, in particular cyclone cells, that are arranged in parallel relative to the fluid flow. Such a cyclone block can be referred to as multi-cyclone block. With the pre-separator module, dust and/or water can be separated from the gaseous fluid. The pre-separator module may comprise a discharge opening, in particular a dust discharge socket, through which the preliminarily separated dust and/or water can be removed from the pre-separator module.

The at least one pre-separator module can be designed advantageously to be of a multi-part configuration. The pre-separator housing may comprise an outer separator housing frame. The separator housing frame can surround circumferentially the main flow axis, in particular continuously. The separator housing frame may be open at least at one end face. With the separator housing frame, parts of the pre-separator cells can be connected, in particular monolithically. Moreover, the at least one pre-separator module can comprise at least one end plate, in particular an immersion tube plate. The end plate can be arranged at an end face of the separator housing frame. In particular, the end plate can close off or delimit at least partially the separator housing frame at the at least one end face. The immersion tube plate can comprise corresponding immersion tubes of the pre-separator cells, in particular of the cyclone cells. By attachment of the immersion tube plate onto the separator housing frame, the pre-separator cells can be completed with the immersion tubes.

The separator housing frame and the at least one end plate can be pre-manufactured as separate components, in particular formed of plastic material. The components, depending on whether the pre-separator module is to be arranged in the adapter chamber or outside of the adapter chamber, can be combined with each other to the appropriate pre-separator module.

The separator housing frame and the at least one end plate can be connected to each other prior to common mounting on the housing main part. Alternatively, the separator housing frame and at least one end plate can also be completed sequentially with the housing main part and, on the latter, to the pre-separator module.

By simple exchange of at least one appropriate interchangeable insert in a housing tool for forming the separator housing frame and/or in a tool, in particular in an immersion tube plate tool, for forming the at least one end plate, in particular the immersion tube plate, a plurality of configurations of separator housing frames and end plates that can be modularly combined with each other can be produced.

At least one filter element may comprise at least one filter bellows which can be flowed through in axial direction relative to an element axis. The at least one filter element can be designed as a so-called flat filter element. An element axis of at least one filter element can extend parallel to the main flow axis or can coincide therewith. The element axis can also be extending at a slant relative to the main flow axis.

Advantageously, at least one filter element may comprise at least one filter bellows made from or with at least one filter medium suitable for filtration of the fluid.

The at least one filter medium can be filter paper, filter nonwoven, filter foam, meltblown, nonwoven, woven or another type of filter medium that is suitable for filtration of in particular gaseous fluid, in particular air, or a combination of different filter media. The filter medium can be a single layer or multi-layered. Advantageously, the filter medium can be shapeable, in particular foldable and/or bendable.

Advantageously, the filter bellows can be open. In an open filter bellows in the meaning of the invention, the filter medium is not closed to a hollow body. In contrast thereto, in a hollow filter element, in particular a so-called round filter element, the filter medium is circumferentially closed and surrounds an element interior.

Advantageously, at least one filter element can be a flat filter element with an open filter bellows.

At least one filter element can be flat or curved. In this context, an inflow side and/or an outflow side of the filter bellows can be flat, curved, or stepped. The filter element can also be box-shaped.

The filter bellows can have approximately the shape of a polyhedron. Advantageously, the filter bellows can be prism-shaped, cubic, parallelepipedal, pyramid-shaped, wedge-shaped or the like. In this context, it is not required that all sides, in particular circumferential sides, of the filter bellows are flat. The sides of the filter bellows can also be partly curved or stepped. Opposed sides can extend parallel to each other. Alternatively or additionally, at least two opposed sides can also extend at a slanted, or in other ways non-parallel relative to each other.

In a prism-shaped filter bellows, advantageously one end face, in particular the inflow side, can be extending perpendicular to the main flow axis. The opposed end face, in particular the outflow side, can be positioned at a slant relative to the first named end face, in particular, the inflow side. At least two opposed circumferential sides of the filter bellows can be extending parallel to each other. Advantageously, the filter bellows can have a rectangular or square cross-section perpendicular to the main flow axis.

Advantageously, the filter bellows can comprise a zigzag-shaped filter medium which is folded along fold edges. The folds can advantageously extend along the main flow direction which then defines the orientation of their fold height. The folds of the filter bellows can extend advantageously between the inflow side and the outflow side of the filter bellows. The fold height is then the respective spacing between an inflow-associated fold edge and its neighboring outflow-associated fold edge, in particular in the main flow direction. The inflow-associated fold edges define the inflow side and the outflow-associated fold edges define the outflow side of the filter bellows. Advantageously, the inflow-associated fold edges can extend parallel to each other. In addition or as an alternative, the outflow-associated fold edges can extend parallel relative to each other. The inflow-associated fold edges and the outflow-associated fold edges can extend parallel to each other.

Advantageously, the filter bellows may comprise a zigzag-shaped folded filter medium with deep folds. In case of an approximately prism-shaped or parallelepipedal filter bellows, one speaks of deep folds in particular when a fold height is at least approximately as large as the expansion of the filter bellows transverse to the folds in the direction of the fold edges and/or in the direction transverse to the fold edges.

Advantageously, a height, in particular fold height, of the filter bellows, which is axial with respect to an element axis and/or the main flow axis, may vary.

The filter bellows can be realized alternatively as a solid block of an appropriate filter medium, in particular of a filter foam.

Advantageously, at least one filter element may comprise at least a part of a sealing device, in particular a sealing surface and/or a seal, for sealing an area between the at least one filter element and the filter housing. At least one part of at least one sealing device can be arranged in the area of the outflow side of the at least one filter element. Alternatively or additionally, at least one part of a sealing device can be arranged in the area of the inflow side of the at least one filter element.

At least one filter element can advantageously comprise at least one end member, in particular an end disk. The at least one end member can be in particular connected seal-tightly with the filter bellows. The at least one end member can at least contribute to shaping and/or stabilization of the filter bellows. Moreover, the at least one end member can contribute to the support action in the filter housing, in particular in the housing main part. Moreover, the at least one end member may comprise at least one part of a sealing device.

Advantageously, the at least one end member can form at least partially an element frame. The element frame can surround the filter bellows in particular with regard to the main flow axis and/or the element axis circumferentially, in particular continuously. The filter bellows can be held stably, in particular with regard to its shape, in the element frame.

Advantageously, the filter system can comprise at least three stages. It may comprise at least one pre-separator module, at least one main filter element, and at least one secondary filter element in flow direction behind each other. In this way, an even more efficient purification of the gaseous fluid in relation to the required mounting space can be realized.

At least one main filter element can advantageously be of a prismatic shape. In the mounted state, the broad circumferential side of the prism can face the mounting opening of the housing main part. In this way, the prismatic main filter element can be easily introduced, with its narrow circumferential side leading, transversely to the main flow axis through the mounting opening into the element receiving space.

Advantageously, the filter system can additionally comprise at least one secondary filter element. The at least one secondary filter element can be arranged downstream of the at least one main filter element. With the at least one secondary filter element, finest particles, still contained in the gaseous fluid after passage through the at least one main filter element, can be filtered out. The at least one secondary filter element can be a so-called flat filter element. The at least one secondary filter element, viewed in flow direction, can comprise a significantly reduced height in comparison to the at least one main filter element.

Advantageously, when using a prism-shaped main filter element, the at least one secondary filter element can be arranged downstream of an outflow side of the at least one main filter element that is slanted relative to the main flow axis. The at least one secondary element can be advantageously arranged parallel to the outflow side of the at least one prism-shaped main filter element. Its element axis and/or the flow axis through the at least one secondary element can extend at a slant relative to the main flow axis.

The filter system, in particular the housing main part, can advantageously be a part of an air guiding area, in particular of an air intake manifold or an air outlet manifold, of an internal combustion engine of a motor vehicle, of a construction or agricultural machine and/or of a compressor. It can serve for purifying combustion air or engine air which is supplied to the internal combustion engine. The invention is however not limited to a filter system of an air guiding area of an internal combustion engine of a motor vehicle and/or of a construction or agricultural machine. In fact, it can also be employed in other types of filter systems for gaseous fluids of motor vehicles and/or of construction or agricultural machines. The filter system can also be an interior cabin filter system. The filter system can also be used outside of automotive technology, in particular in industrial motors.

Air filter systems according to the invention for filtration of combustion air can also ensure an increased air throughput through the engine in internal combustion engines with increased motor power, which in particular meet strict emissions regulations.

The filter system according to the invention can be configured to be very compact with the housing main part according to the invention and can thus be used in a space-saving way even in machines in which it is standard practice to employ a large number of component groups, in particular of an air conditioning device. The compact filter system according to the invention can be arranged in an available mounting space of a motor vehicle or a machine that is reduced due to the corresponding component groups.

In an advantageous embodiment, the adapter chamber can be delimited at least partially by circumferential walls of the housing main part. With the circumferential walls, the adapter chamber can be closed off outwardly at least partially relative to the environment. Moreover, in this way the at least one filter element and/or the at least one pre-separator housing can be more simply and more stably arranged, in particular positioned, in the at least one adapter chamber. Also, already existing walls of the housing main part can be employed in order to delimit the adapter chamber. In this way, manufacture of the housing main part can be simplified. Moreover, material can be saved. This reduces the weight of the housing main part and the manufacturing costs.

Advantageously, an installation/attachment direction of the preliminary separation module in/on the adapter chamber can extend axially or parallel to the main flow axis. The pre-separator module can thus be connected simply in linear direction with the housing main part. In this way, the pre-separator module can be easily introduced into the adapter chamber that, as a whole, is circumferentially bounded.

In a further advantageous embodiment, the adapter chamber in form and dimension can be designed such that at least one pre-separator housing of the at least one pre-separator module can be arranged at least partially, in particular completely, in the adapter chamber. In this way, the outer dimension of the filter system can be reduced by the portion of the at least one pre-separator module which is arranged in the adapter chamber. The filter system can thus be realized to be even more compact. Moreover, the at least one pre-separator module is arranged in the adapter chamber of the housing main part in a protected way relative to the environment.

In a further advantageous embodiment, at least one intermediate circumferential wall which delimits the adapter chamber at the side of the mounting opening can extend into an area within the at least one cover receiving rim. In this way, the adapter chamber by means of the at least one intermediate wall can be delimited at least relative to the mounting opening. In this context, the at least one cover receiving rim and preferably also the mounting opening project also past this intermediate wall in accordance with the invention In this way, a housing cover can be employed that is of the same configuration that can be used also for a housing main part without intermediate wall. The intermediate wall can advantageously be joined monolithically with the remainder of the housing main part.

Advantageously, for realizing a housing main part with intermediate wall and a housing main part without intermediate walls, substantially the same forming tools can be employed. For realizing the two different configurations, it may only be required to exchange an interchangeable tool, in particular an interchangeable core. The outer shape, in particular in the area of the cover receiving rim and of the mounting opening, of the different configurations of the housing main part with and without intermediate wall can be identical, on the other hand. Therefore, they can be produced with the same tools.

Advantageously, the intermediate wall can be designed and/or arranged such that a filter element with greater expansion in the direction of the main flow axis can also be introduced from the element receiving space partially into the adapter chamber.

In a further advantageous embodiment, in at least one circumferential wall that is delimiting the adapter chamber, in particular of the housing main part, at least one, in particular optional, passage for at least one discharge opening, in particular a discharge socket, of the at least one pre-separator module can be prepared, in particular arranged, for discharging media that have been separated with the pre-separator module, in particular particles and/or water. The at least one discharge opening can be brought into alignment with the at least one passage so that the separated media can exit from the at least one pre-separator module through the discharge opening and the passage. Optionally, at least one discharge socket of the at least one pre-separator module can be passed through the appropriate passage of the circumferential wall. The at least one pre-separator module can thus be arranged with a section or portion, in particular with a separator housing frame that is provided with the at least one discharge socket, in the adapter chamber.

Advantageously, several optional passages can also be prepared or realized in different circumferential walls. In this way, pre-separator modules with discharge openings at different locations can be combined optionally with the same housing main part.

Advantageously, at least one passage can be located at the raw side of the in particular seal-tight connecting device of the at least one pre-separator module with the at least one housing main part. In this way, it is not required to separately seal the at least one passage relative to the environment.

Optional passages which are not required can be closed off.

At least one optional passage can be realized already during manufacture of the housing main part. The passage can optionally be closed off subsequently, as needed. Advantageously, the passage that is not required can be automatically closed off with a corresponding section of the installed pre-separator module, in particular of the separator housing frame. In this way, separate closure elements are not required. Alternatively, passages that are not required can be closed off with separate closure elements.

Advantageously, at least one prepared optional passage can initially be closed off during manufacture of the housing main part and can be openable, as needed. In particular, the at least one optional passage can be cut out, stamped out, broken out from the material of the circumferential wall of the housing main part or opened in another way. The circumferential wall of the housing main part can already be pre-stamped for this purpose in the area of the at least one optional passage, can be provided with a reduced material thickness, or can be prepared in another way.

At least one prepared optional passage can be opened in a simple way when at least one portion of the pre-separator module with a discharge socket is to be arranged within the adapter chamber. When the at least one pre-separator module is to be arranged such that the at least one discharge socket is located outside of the adapter chamber, the at least one prepared optional passage can remain closed.

By means of the optional passages, one and the same main part can be used simply for the arrangement of the pre-separator module with the discharge opening in the adapter chamber as well as outside of the adapter chamber. In this way, a flexibility of the in particular modularly configured filter system can be further increased. The number of required basic modules or base modules can be reduced.

In a further advantageous embodiment, the housing main part can comprise a filter-associated connecting flange of the connecting device with which the pre-separator module, in particular a separator-associated connecting flange, can be connected.

The filter-associated connecting flange can advantageously surround the main flow axis circumferentially, in particular in a closed fashion. A connecting plane of the filter-associated connecting flange can advantageous extend perpendicular to the main flow axis. The connecting plane can advantageously be pointing toward the open side of the adapter chamber that is facing away from the element receiving space, in particular toward the environment. In this way, the at least one pre-separator module can be placed simply from the exterior onto the filter-associated connecting flange.

The filter-associated connecting flange can be located in an area of the adapter chamber which adjoins the element receiving space. In this way, the at least one pre-separator module can be arranged at least partially within the adapter chamber and can be placed with its end face onto the filter-associated connecting flange within the adapter chamber.

Alternatively or additionally, a filter-associated connecting flange can be arranged in an area which is facing the environment, i.e., facing axially away from the element receiving space, in particular outside of the adapter chamber. In this way, the at least one pre-separator module can be placed outside of the adapter chamber onto the appropriate filter-associated connecting flange. In this context, at least a portion of the pre-separator module, in particular of the pre-separator housing, can be located within the adapter chamber. Alternatively or additionally, at least a portion of the pre-separator module, in particular of the pre-separator housing, can be located outside of the adapter chamber.

Advantageously, the pre-separator module can comprise a separator-associated connecting flange with which the pre-separator housing can be connected, in particular detachably, with an appropriate filter-associated connecting flange associated with the housing main part.

Advantageously, the separator-associated connecting flange can project past the pre-separator housing, in particular a separator housing frame, and past the adapter chamber transversely relative to the main flow axis. The separator-associated connecting flange enlarges in this way the dimensions of the pre-separator housing transverse to the main flow axis. In this way, the separator-associated connecting flange can be mounted from the exterior outside of the adapter chamber onto an appropriate filter-associated connecting flange.

By pivoting perpendicular to the main flow axis about 180°, the pre-separator module can be inserted into the adapter chamber with its narrower end face leading, which end face is axially facing away from the separator-associated connecting flange relative to the main flow axis.

In this way, the pre-separator module, depending on the employed size of the at least one filter element, can be arranged outside or inside the adapter chamber. In this way, the flexibility of the filter system can be further improved.

Should a filter-associated connecting flange be located on a side of the adapter chamber which, relative to the main flow axis, is axially downstream, an appropriate separator-associated connecting flange can be located within an axial projection of the pre-separator housing, in particular of the separator housing frame. The pre-separator module can thus be arranged within the adapter chamber and can be fastened at the downstream side of the adapter chamber by means of the connecting flange to the housing main part.

In a further advantageous embodiment, the adapter chamber and/or the pre-separator module, in particular the pre-separator housing, can be cylindrical, in particular can be of an approximately square or rectangular cross-section, wherein a cylinder axis extends parallel or axial to the main flow axis. Matching cylindrical configurations enable a simple insertion of the pre-separator module into the adapter chamber. In case of a square or rectangular cross-section, an anti-rotation action can be achieved moreover. With a rectangular cross-section, the degrees of freedom for a mounting orientation of the pre-separator module can be limited.

The object is furthermore solved according to the invention for the filter system in that the filter system comprises at least one filter housing which comprises at least one inlet for the fluid to be filtered, at least one outlet for filtered fluid, and in/on which, along a main flow axis of the fluid to be filtered, at least one pre-separator module and at least one exchangeable filter element are arranged behind each other such that they separate the at least one inlet from the at least one outlet, wherein a housing main part of the filter housing relative to the main flow axis comprises laterally at least one mounting opening which is closable by a housing cover, through which the at least one filter element can be installed in an element receiving space of the housing main part and removed therefrom, and wherein the housing main part, at an end face that is axial relative to the main flow axis, comprises an adapter chamber that, relative to the main flow axis, is open in axial direction toward the element receiving space and, axially opposed thereto, toward the environment, and on or in which the at least one pre-separator module and/or at least one filter element is arranged or can be arranged at least partially, and wherein at least one cover receiving rim that surrounds the mounting opening and the housing cover extend across at least a portion of the adapter chamber.

The object is furthermore solved according to the invention for the pre-separator module in that the pre-separator module in/on a housing main part of a filter housing of the filter system, along a main flow axis of the fluid to be filtered, is arranged in front of at least one exchangeable filter element in such a way that it separates at least one outlet of the housing main part from at least one inlet of the filter housing for the fluid to be filtered, wherein the at least one inlet can be at least partially formed by the pre-separator module, and wherein the pre-separator module has a narrow end face and a wider area axially oppositely positioned relative to the main flow axis, in particular an end face, so that, by pivoting about 180° relative to a main flow axis, it can be selectively arranged with the narrow end face leading at least partially in or, with the wider area leading, in particular the wider end face, on an adapter chamber of the housing main part.

In other respects, the features and advantages disclosed in the context with the housing main part according to the invention, the filter system according to the invention, and the pre-separator housing according to the invention and their respective advantageous embodiments mutually apply correspondingly, and vice versa. The individual features and advantages of course can be combined among each other, wherein further advantageous effects may result which surpass the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in the drawing, the description, and the claims in combination also expediently individually and combine them to other meaningful combinations.

FIG. 7 shows an isometric illustration of the air filter system of FIGS. 5 and 6 without housing cover.

In the Figures, same components are provided with same reference characters.

DETAILED DESCRIPTION

Figure 1:
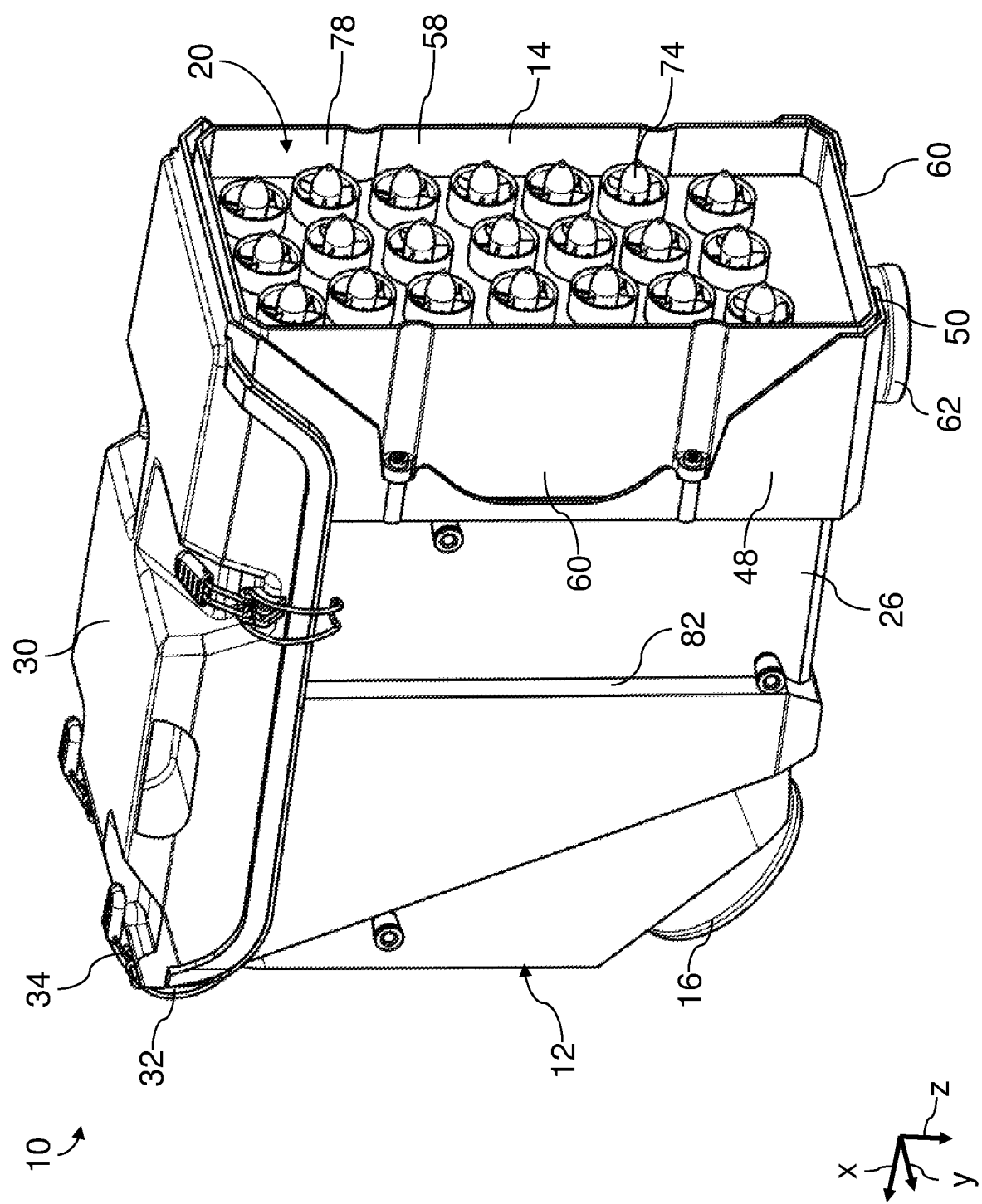
FIG. 1 shows an isometric illustration of an air filter system of an internal combustion engine of a construction or agricultural machine according to a first embodiment, comprising a pre-separator module that is arranged in a receiving chamber of a housing main part, and comprising a main filter element which is arranged hidden in an element receiving space of the housing main part in FIG. 1.

In FIGS. 1 to 4, an air filter system 10 according to a first embodiment is shown in different perspectives and section views. The air filter system 10 can be used, for example, in an air intake manifold of a construction or agricultural machine for filtering air.

The air filter system 10 comprises a filter housing 12 with an inlet 14 for air to be purified and an outlet 16 for purified air. For the air filter system 10, a pre-separator module 20, a main filter element 22, and a secondary filter element 24 are arranged behind each other between the inlet 14 and the outlet 16, relative to a main flow axis 18 of the air to be purified. The air filter system 10 is configured with three stages as a so-called inline system. This means that the three filter stages of the air filter system 10, namely the pre-separator module 20, the main filter element 22, and the secondary filter element 24, are arranged substantially linearly behind each other along the main flow axis 18.

To improve comprehension, an X-Y-Z coordinate system is illustrated in the Figures whose X axis is extending parallel to the main flow axis 18.

The filter housing 12 comprises an approximately parallelepipedal housing main part 26 which is preferably formed monolithically of plastic material. The housing main part 26 comprises an outlet socket which forms the outlet 16 and which projects outwardly from an outflow-associated end-face end wall relative to the main flow axis 18. An axis of the outlet socket is preferably slanted by approximately 45 degrees relative to the main flow axis 18 in the X-Z plane of the X-Y-Z coordinate system. The outflow-associated end wall of the housing main part 26 is preferably slanted correspondingly.

Figure 2:
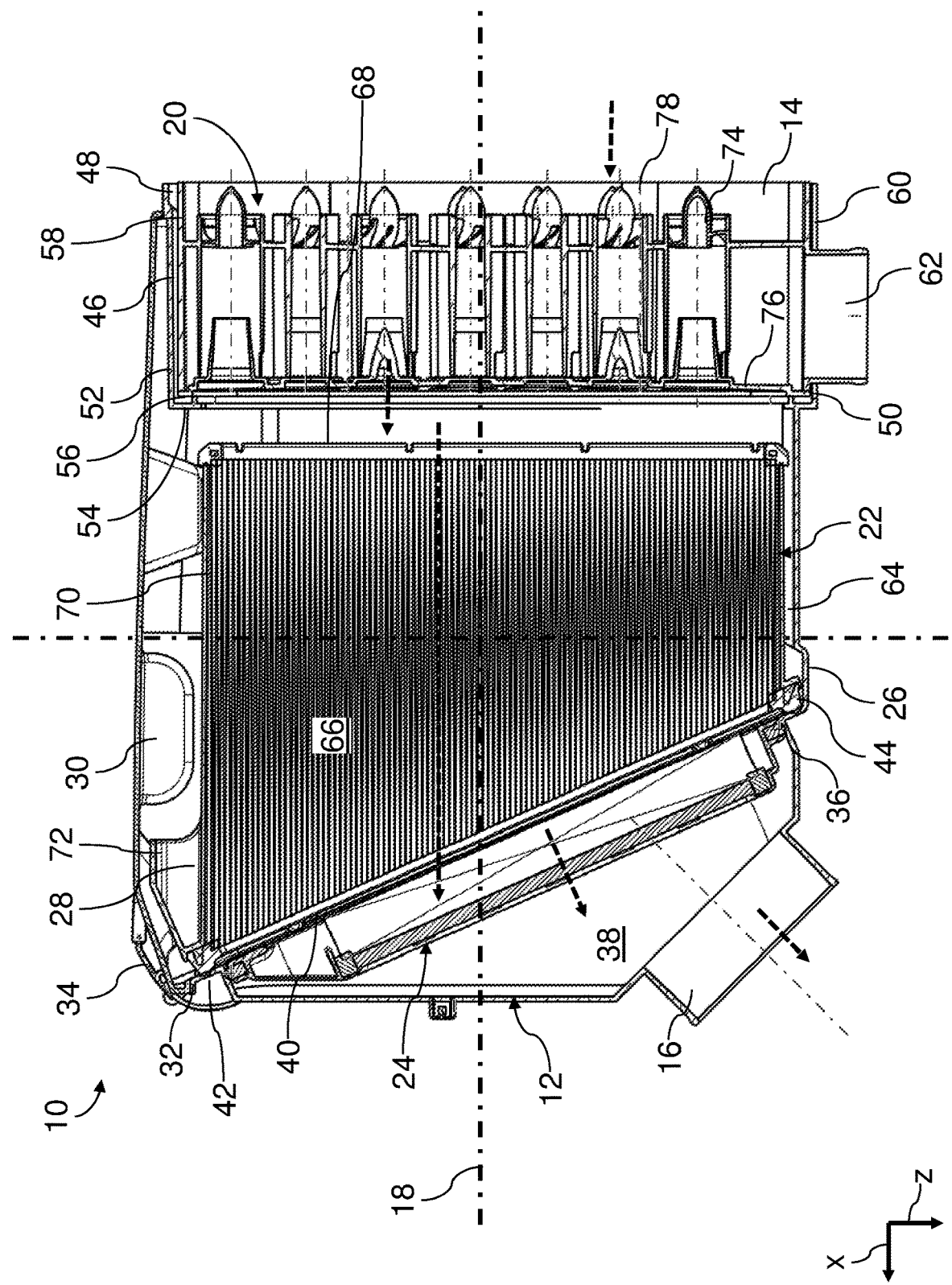
FIG. 2 shows a longitudinal section of the air filter system of FIG. 1.

On a cover side which is extending substantially parallel to the main flow axis 18 and the X-Y plane of the X-Y-Z coordinate system, the housing main part 26 has a mounting opening 28 for installation and removal and for servicing of the main filter element 22 and of the secondary filter element 24. The mounting opening 28 extends preferably almost across the entire axial expansion of the housing main part 26 relative to the main flow axis 18. Further preferred, the mounting opening 28 extends laterally into the oppositely positioned sidewalls of the housing main part 26. In the operative state, the mounting opening 26, as shown in FIGS. 1 and 2, is closed off with a removable housing cover 30 of the filter housing 12.

The mounting opening 28 is surrounded continuously by a cover receiving rim 32 in circumferential direction. In the operative state, as shown in FIGS. 1 and 2, an appropriate cover rim of the housing cover 30 is in particular seal-tightly resting, circumferentially closed, on the cover receiving rim 32. The housing cover 30 is secured by means of releasable clamps 34 on the housing main part 26.

In the interior of the housing main part 26, a receiving frame 36 for the optionally employable secondary filter element 24 is arranged on the side which is facing the outlet 16. The receiving frame 36 extends preferably at a slant relative to the main flow axis 18 and is penetrated by it. On the receiving frame 36, a circumferentially continuous sealing area of the secondary filter element 24 is resting seal-tightly, preferably radially, relative to an axis of the secondary filter element 24. The secondary filter element 24 separates a clean air side 38 of the air filter system 10 from a main element outflow side 40 of the main filter element 22. The clean air side 38 is connected to the outlet 16.

Fluidically upstream of the receiving frame 36, a flat sealing surface 42 is arranged for supporting an axial seal 44 of the main filter element 22. The sealing surface 42 extends circumferentially closed coaxially relative to and/or about the axis of the secondary filter element 24. The sealing surface 42 surrounds the receiving frame 36 and adjoins the latter preferably, in particular such that the receiving frame 36 is formed as an opening within the sealing surface 42. The sealing surface 42 is preferably flat and extends radially and circumferentially relative to the axis of the secondary filter element 24. It is facing toward the main filter element 22. The plane of the sealing surface 42 extends thus at a slant relative to the main flow axis 18.

The axial seal 44 surrounds in a circumferentially continuous way the main element outflow side 40 of the main filter element 22, relative to the main flow axis 18 which is coinciding in the instant embodiment with an element axis of the main filter element 22.

On the inlet side which is axially facing away from the outlet 16 relative to the main flow axis 18, the housing main part 26 comprises an adapter chamber 46. The adapter chamber 46 is approximately parallelepipedal in shape. In the illustrated embodiment, the pre-separator module 20 is arranged in the adapter chamber 46.

The adapter chamber 46 is surrounded in circumferential direction relative to the main flow axis 18 by opposed sidewalls 48, a bottom wall 50, and an intermediate cover wall 52 of the housing main part 26. The sidewalls 48 extend parallel to the X-Y plane of the X-Y-Z coordinate system. The bottom wall 50 and the intermediate cover wall 52 extend each parallel to the Y-Z plane.

On their side which is facing axially relative to the main flow axis 18 the outlet 16, the sidewalls 48, the bottom wall 50, and the intermediate cover wall 52 constitute a filter-associated connecting flange 54 which, relative to the main flow axis 18, is extending circumferentially and is of a stepped configuration radially inwardly. On the filter-associated connecting flange 54, an appropriate separator-associated connecting flange 56 of a pre-separator housing 58 of the pre-separator module 20 can be seal-tightly attached. The pre-separator housing 58 forms also a portion of the filter housing 12. It comprises the inlet 14.

An inner width of the adapter chamber 46 perpendicular to the main flow axis 18, i.e., in the Y-Z plane, is greater than the corresponding space requirement of the main filter element 22 transverse to the main flow axis 18 and of the pre-separator housing 58 transverse to the main flow axis 18. In this way, the pre-separator housing 58 as well as the main filter element 22 can be arranged selectively and/or each partially in the adapter chamber 46.

The sidewalls 58 and the bottom wall 50 each comprise an optional passage 60. The passages 60 each have the shape of an approximately parabolic cutout. The passages 60 each are open on their sides that are axially facing away from the outlet 16 relative to the main flow axis 18. Optionally, a corresponding dust discharge socket 62 of the pre-separator module 20 can be guided through the passages 60.

Figure 4:
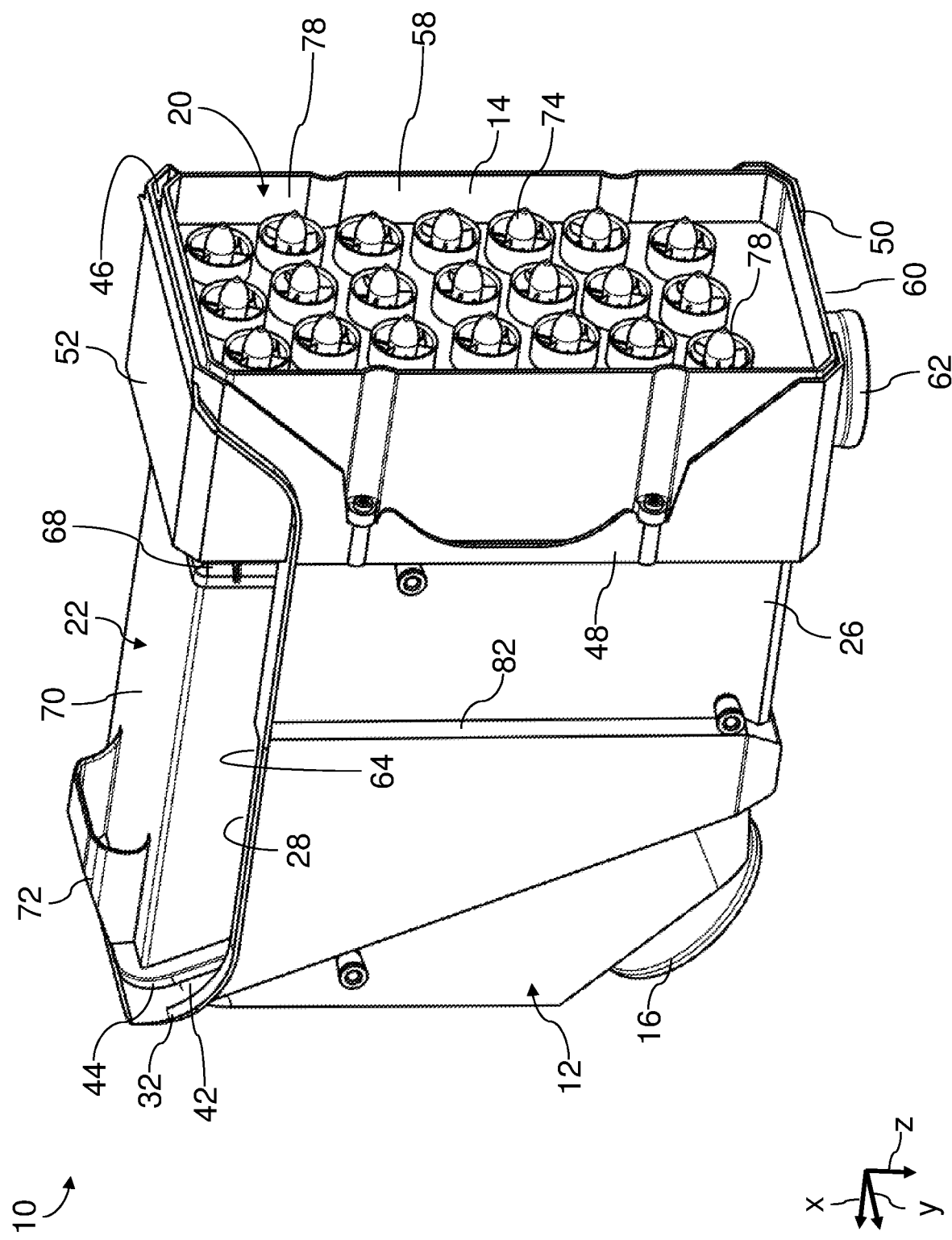
FIG. 4 is an isometric illustration of the air filter system of FIGS. 1 to 3 without housing cover.

In the conventional operating orientation of the air filter system 10, as shown in FIGS. 1 and 4, the dust discharge socket 62 is positioned spatially at the bottom on the pre-separator module 20. In this way, water and dust particles separated by the pre-separator module 20 can sink downwardly, following the force of gravity, and be discharged thereat. In the illustrated embodiment, the dust discharge socket 62 in an exemplary fashion passes through the passage 60 in the bottom wall 50. The air filter system 10 can however also be operated in an orientation that is different from that which is being shown. In this case, the pre-separator module 20 can be modified such that the dust discharge socket 62 extends outwardly at a different side and passes through one of the other optional passages 60.

On the side which is facing the outlet 16 relative to the main flow axis 18, the adapter chamber 46 is open toward the interior of the housing main part 26. Also, the adapter chamber 46 is open at the side which is facing away from the outlet 16 relative to the main flow axis 18 so that the pre-separator module 20 can be inserted there.

The mounting opening 28 and the cover receiving rim 32 extend on the inlet side of the filter housing 12 across the adapter chamber 46 and the intermediate cover wall 52. In this way, the adapter chamber 46 is freely accessible through the mounting opening 28 when the housing cover 30 is removed, as shown in FIG. 4.

Between the adapter chamber 46 and the sealing surface 42, the housing main part 26 has an element receiving space 64 for the main filter element 22. The element receiving space 64 is accessible from the exterior through the mounting opening 28. The mounting opening 28 and the cover receiving rim 32 extend across the entire expansion of the element receiving space 64 on the cover side of the housing main part 26. The element receiving space 64 is open toward the adapter chamber 46.

The main filter element 22 comprises a folded bellows 66. The folded bellows 66 is comprised of a zigzag-shaped folded filter medium, for example, filter paper. The fold edges are located at the main element outflow side 40 and at a main element inflow side 68 which is axially opposed relative to the main flow axis 18. The fold edges extend parallel to each other and extend perpendicular to the main flow axis 18, i.e., in the direction of a Y axis of the X-Y-Z coordinate system. The folds extend parallel to the main flow axis 18, i.e., parallel to the X axis of the X-Y-Z coordinate system.

The fold height is defined as a spacing between neighboring inflow-associated fold edges and outflow-associated fold edges. Viewed perpendicular to the main flow axis 18 in Z direction, the fold height is reduced in a stepwise fashion from the side, which is facing the mounting opening 28 in the mounted state, toward the bottom side. The folded bellows 66 and thus the main filter element 22 has an approximately prismatic shape as a whole. The expansion of the main filter element 22 in the direction of the main flow axis 18, i.e., the element axis, decreases, viewed perpendicular to the main flow axis 18, from the mounting opening 28 toward the bottom of the housing main part 26 in accordance with the dimensions of the element receiving space 64.

The main element inflow side 68 extends perpendicular to the main flow axis 18. In cross section perpendicular to the main flow axis 18, the main filter element 22 is rectangular. The folded bellows 66 has perpendicular to the main flow axis 18 a rectangular cross section. The circumferential sidewalls of the folded bellows 66 extend in pairs parallel to each other and parallel to the main flow axis 18. In this context, the wide sides extend parallel to the X-Z plane and the narrow sides parallel to the X-Y plane. The main element outflow side 40 of the main filter element 22 extends at a slant to the main element inflow side 68 and at a slant to the element axis, i.e., to the main flow axis 18.

The filter bellows 66 is circumferentially surrounded by an element frame 70 which is coaxial relative to the element axis and which comprises the outer shape of the filter bellows 66. On its upper circumferential side which is facing the mounting opening 28, the element frame 70 is provided externally with a grip 72 by which the main filter element 22 can be gripped and removed from the filter housing 12 and installed in the latter.

The axial seal 44 is attached to the outflow-associated rim of the element frame 70. The main filter element 22 ends, viewed from the outlet 16 in the direction of the main flow axis 18, before the adapter chamber 46.

The secondary filter element 24 is designed as an approximately rectangular flat filter element. It comprises a filter bellows which is surrounded by a circumferential radial seal. The radial seal is resting radially seal-tightly on the receiving frame 36.

The pre-separator module 20 is designed herein as a cyclone block. In the cyclone block, a plurality of individual pre-separator cells 74, which may also be referred to as cyclone cells, are connected fluidically in parallel in a so-called multi-cyclone block. Dust or water that has been pre-separated in the cyclone block is removed through the dust discharge socket 62 from the pre-separator housing 58.

The separator-associated connecting flange 56 of the pre-separator module 20 is realized at an immersion tube plate 76. The immersion tube plate 76 is arranged on an end face rim of a separator housing frame 78 of the pre-separator housing 58 that is facing the filter-associated connecting flange 54. The immersion tube plate 76 comprises immersion tubes of the respective pre-separator cells 74. The remaining parts of the pre-separator cells 74 are monolithically connected within the separator housing frame 78 with the latter. The separator housing frame 78 is rectangular and box-shaped and is open at the two end faces. It is arranged coaxially to the main flow axis 18. The immersion tube plate 76 with the separator-associated connecting flange 56 is approximately flush with the separator housing frame 78 in radial outward direction relative to the flow axis 18.

Optionally, the separator housing frame 78 can be connected with an immersion tube plate, not illustrated in the Figures, whose separator-associated connecting flange projects past the separator housing frame 78 radially in outward direction. Correspondingly, the sidewalls 48, the bottom wall 50, and a cover wall, for example, the intermediate cover wall 52, can be provided with a corresponding outer filter-associated connecting flange, not shown in the Figures, outside of the adapter chamber 46 at the end face of the housing main part 26 which is facing away from the outlet 16 relative to the main flow axis 18. The pre-separator module 20 can be attached with the larger separator-associated connecting flange to the corresponding larger filter-associated connecting flange outside of the adapter chamber 46 on the housing main part 26. In this case, the optional passages 60 are not required. They can be closed off with appropriate cover plates. The adapter chamber 46 is then available, for example, for receiving a portion of a main filter element that, in comparison to the illustrated main filter element 22, is longer in the direction of the main flow axis 18.

Figure 3:
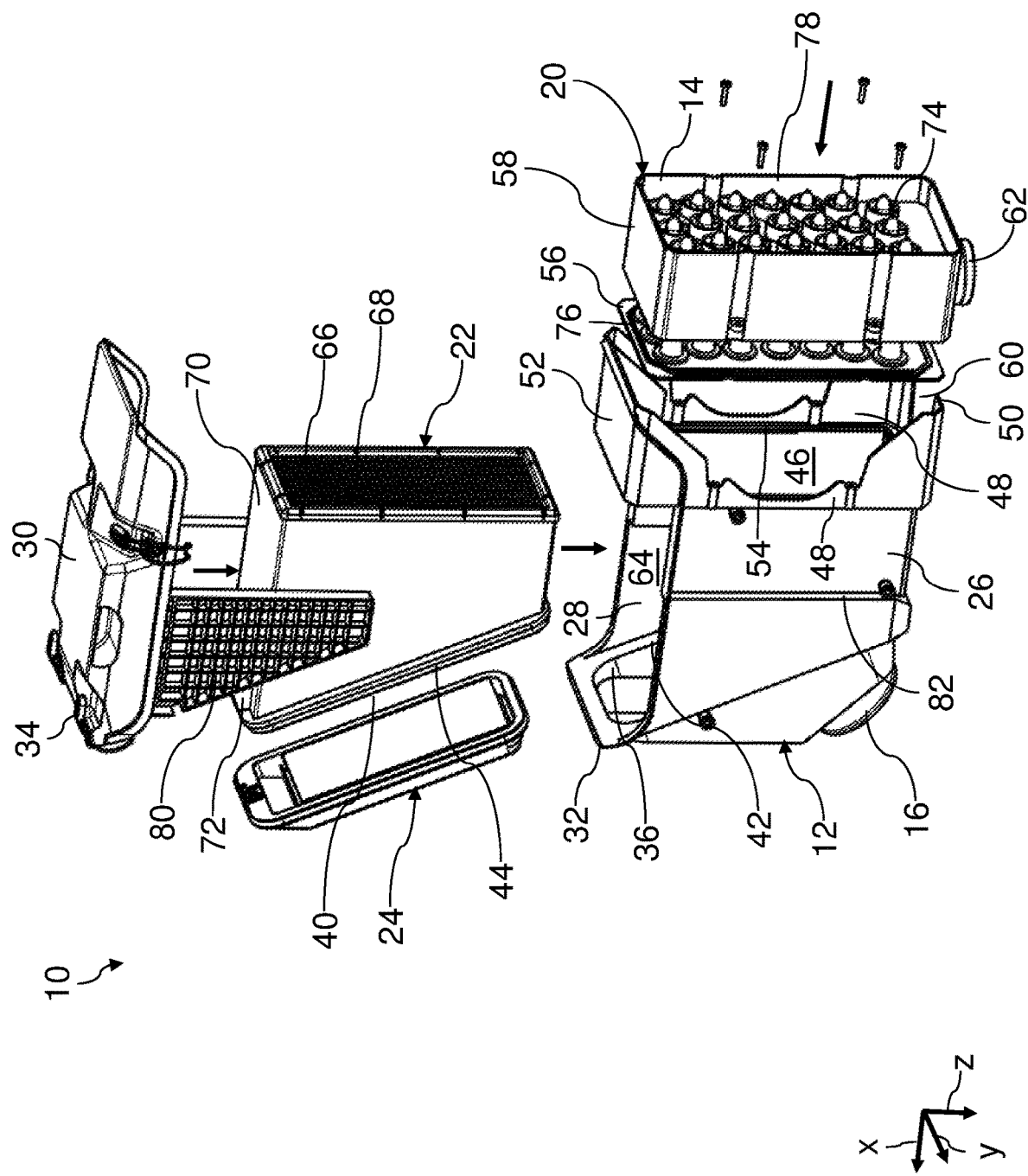
FIG. 3 is an exploded illustration of the air filter system of FIGS. 1 and 2.

The housing cover 30 can be removed, perpendicular to the main flow axis 18, from the housing main part 26. It has two blade-shaped pressure-applying structures 80 arranged in pairs on the housing cover 30 of which one is shown in FIG. 3. The pressure-applying structures 80 at the outflow side are matched in their shape respectively to the slant of the axial seal 44 of the main filter element 22. At the inflow side, the sides of the pressure-applying structures 80 provided thereat extend perpendicular to the main flow axis 18 in direction of the Z axis.

On a side which is axially opposed to the sealing surface 42 relative to the main flow axis 18, the sidewalls of the housing main part 26 each have an inwardly oriented guide step 82 for guiding and for supporting one of the pressure-applying structures 80, respectively. In the closed state of the housing cover 30, the pressure-applying structures 80 exert a force onto the main filter element 22 which is substantially oriented parallel to the axis of the axial seal 44, in the present case to the element axis of the secondary filter element 24. In this way, relative to the axis of the axial seal 44, an axially oriented pressing force is produced on the axial seal 44 which generates a particularly high sealing action.

For producing the air filter system 10, the housing main part 26, the housing cover 30, the pre-separator module 20, the main filter element 22, and the secondary filter element 24 are each separately pre-manufactured. For this purpose, the housing main part 26, the housing cover 30, the separator housing frame 78 with the appropriate parts of the pre-separator cells 74, and the immersion tube plate 76 with the immersion tubes are formed from plastic material in appropriate forming tools, respectively.

The immersion tube plate 76 is connected with the separator housing frame 78 in such a way that the immersion tubes each project into the corresponding remaining parts of the pre-separator cells 74.

For assembly, the pre-separator module 20, with the immersion tube plate 76 leading, is introduced axially relative to the main flow axis 18 through the open side of the adapter chamber 46 into the latter. In this context, the dust discharge socket 62 is oriented toward the bottom wall 50 of the housing main part 26 and is passed through the appropriate lower passage 60. The separator-associated connecting flange 56 is seal-tightly attached by means of screws to the filter-associated connecting flange 54. For this purpose, the separator housing frame 78 has on its exterior side appropriate depressions through which the corresponding screwing tools can be inserted.

Subsequently, the secondary filter element 24 is inserted through the mounting opening 28 into the element receiving space 64 and is placed into the receiving frame 36.

The main filter element 22 is introduced, with its narrow side leading, through the mounting opening 28 substantially perpendicular to the main flow axis 18 into the element receiving space 64 such that the slanted main element outflow side 40 is facing the secondary filter element 24. In the mounted state, the axial seal 44 is resting on the sealing surface 42.

Subsequently, the housing cover 30, with the pressure-applying structures 80 leading, is placed onto the mounting opening 28 perpendicular to the main flow axis 18. The pressure-applying structures 80 slide along the circumferential sides of the main filter element 22, the guide steps 82, and a collar of the element frame 70 on the rear of the axial seal 44. The main filter element 22 is pressed with the axial seal 44 axially against the sealing surface 42.

Finally, the housing cover 30 is secured by means of the clamps 34 on the housing main part 26.

Figure 5:
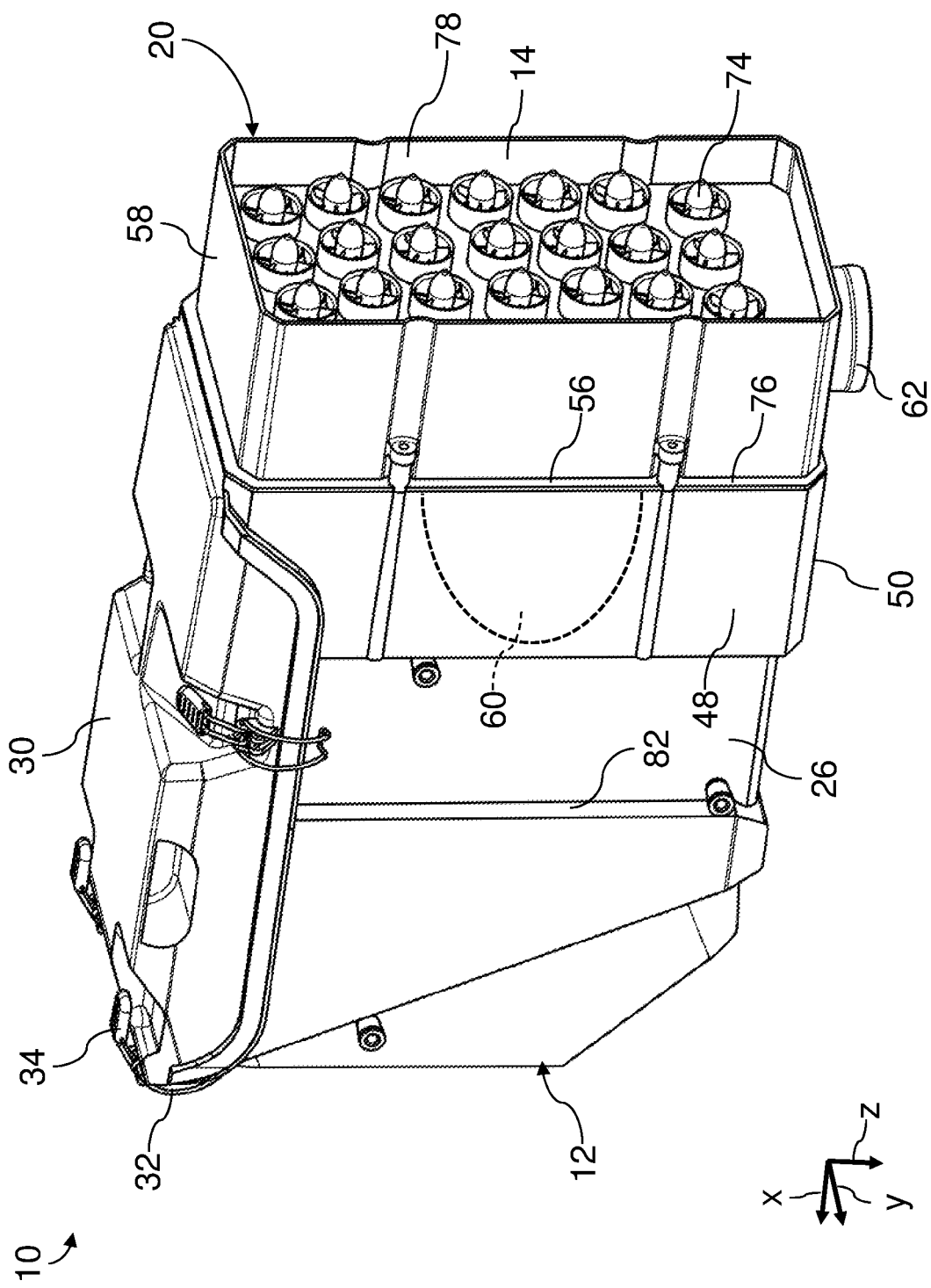
FIG. 5 is an isometric illustration of an air filter system according to a second embodiment in which a main filter element that is bigger than the main filter element of the first embodiment according to FIGS. 1 to 4, projects partially into the adapter chamber and a pre-separator module is arranged outside of the adapter chamber on the housing main part.
Figure 6:
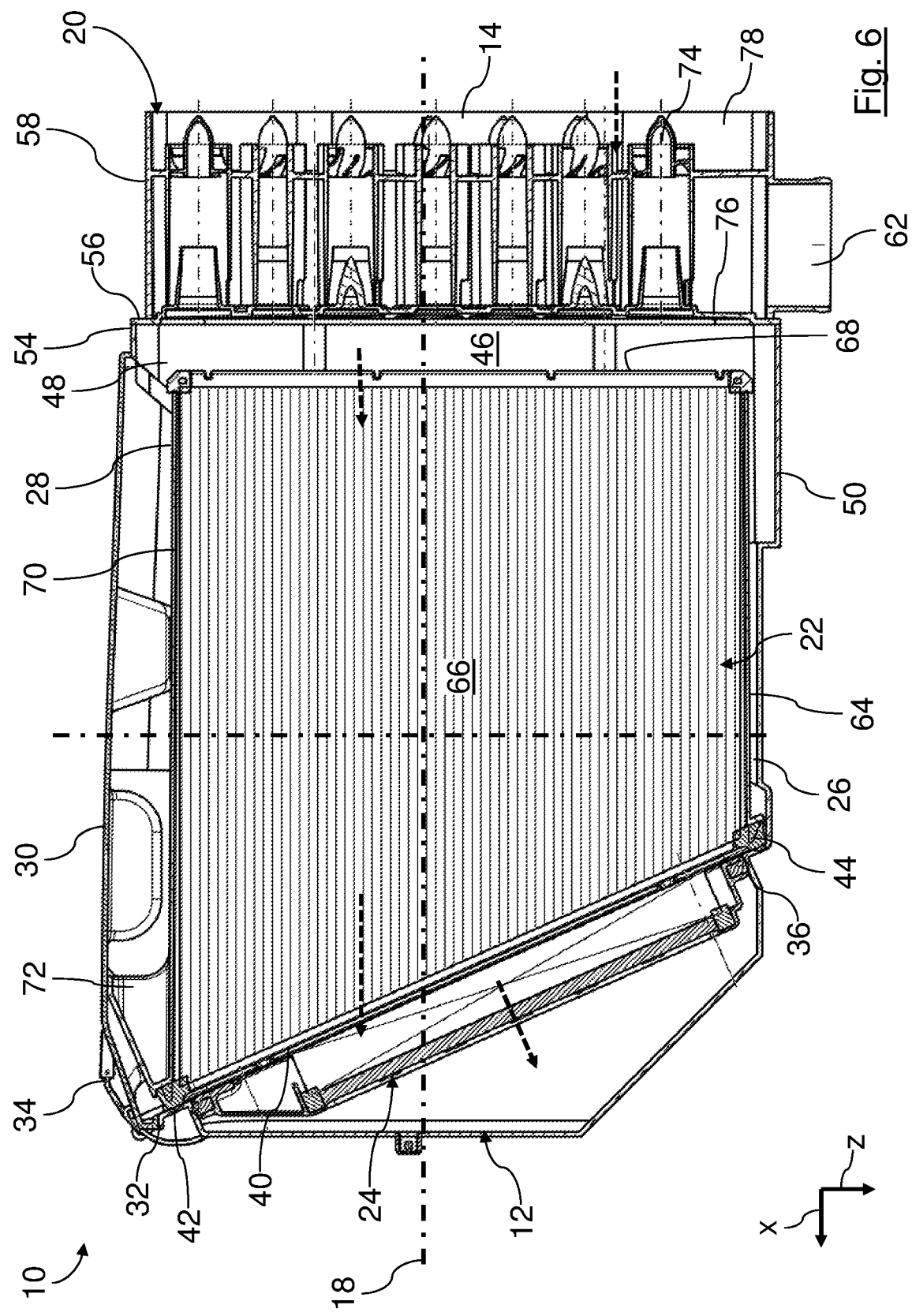
FIG. 6 shows a longitudinal section of the air filter system of FIG. 5.

In FIGS. 5 to 7, an air filter system 10 according to a second embodiment is illustrated. Those elements which are similar to those of the first embodiment of FIGS. 1 to 4 are provided with the same reference characters. In contrast to the first embodiment, in the second embodiment the pre-separator module 20 is not arranged within but outside of the adapter chamber 46. The dust discharge socket 62 is located also outside of the adapter chamber 46 so that corresponding passages in the bottom wall 50 or the sidewalls 48 are not required.

The filter-associated connecting flange 54 is located on the edges, facing away axially from the outlet 16 relative to the main flow axis 18, of the sidewalls 48, of the bottom wall 50, and of the appropriate cover wall of the housing main part 26. An intermediate cover wall is not provided in the second embodiment.

The immersion tube plate 76 projects with the separator-associated connecting rim 56 past the separator housing frame 78 radially in outward direction relative to the main flow axis 18.

The main filter element 22 has a greater axial expansion relative to the main flow axis 18 than the main filter element of the first embodiment so that it does not fit completely into the element receiving space 64. It projects with its main element inflow side 68 into the adapter chamber 46.

In the second embodiment of FIGS. 5 to 7, when using a smaller main filter element, the pre-separator module 20, in analogy to the first embodiment, can also be arranged in the adapter chamber 46. In this case, for example, a smaller immersion tube plate without connecting flange can be used. Instead, at the inlet side of the separator housing frame a separator-associated connecting flange can be arranged which projects past the separator housing frame in radial direction outwardly relative to the main flow axis 18. The separator-associated connecting flange can be realized, for example, in the form of a frame or an end plate which can be attached to the separator housing frame. The separator housing frame can alternatively be realized monolithically together with an appropriate separator-associated connecting flange.

The pre-separator module 20 can also be rotated relative to the main flow axis by 180° and can be inserted in reverse into the adapter chamber 46. In this context, it may be required that the pre-separator cells 74 in the pre-separator housing 58 must also be rotated by 180° so that their flow direction matches the air flow direction.

The passages 60 for the dust discharge socket 62 can be prepared in the bottom wall 50 and the sidewalls 48 as stamped elements, as indicated in dashed lines in FIG. 5. When the pre-separator module 20 is to be arranged within the adapter chamber 46, the corresponding passage 60 can be optionally broken out or cut out along the stamped line. In the illustrated embodiment, the optional passages 60 in the sidewalls 48 and the bottom wall 50 are not opened because the dust discharge socket 62 is located outside of the adapter chamber 46. When from the beginning there is no intention of arranging the pre-separator module 20 within the adapter chamber 46, the housing main part 26 can also be designed without correspondingly prepared optional passages.

In all described embodiments, in particular those shown in FIGS. 1 through 7, the same housing cover 30 can be employed. In this way, only one appropriate forming tool is required for realizing the housing cover 30.

The housing main part, the pre-separator housing, in particular the separator housing frame, and the immersion tube plates or optionally end plates or end frames can be modularly combined with each other, in particular as a function of the size of the employed main filter element.

The housing main parts 26, the separator housing frames 78, and the immersion tube plate 76 of the first embodiment and of the second embodiment may each be produced simply by means of exchange of an appropriate interchangeable insert of the respective forming tool with otherwise identical tools.

What is claimed is:

1. A housing main part of a filter housing of a filter system, the housing main part comprising:
   circumferential walls defining an interior comprising an element receiving space and an adapter chamber;
   at least one outlet communicating with the interior, wherein a fluid to be filtered passes though the interior along a main flow axis from an inlet side of the housing main part to the at least one outlet;
   at least one mounting opening arranged laterally on the housing main part relative to the main flow axis and configured to be closed by a housing cover, the at least one mounting opening configured to enable insertion of at least one exchangeable filter element into the element receiving space or removal of the at least one exchangeable filter element from the element receiving space;
   the housing main part configured to receive at least one pre-separator module,
      wherein the at least one exchangeable filter element is arranged behind the at least one pre-separator module along the main flow axis such that the at least one outlet and an inlet of the filter housing are separated from each other,
   wherein the inlet of the filter housing is at least partially formed by the at least one pre-separator module;
      wherein the adapter chamber is arranged at an axial end face of the housing main part axially arranged relative to the main flow axis, wherein the adapter chamber, relative to the main flow axis, is open axially toward the element receiving space and, axially opposed thereto, toward an environment;

wherein the adapter chamber is configured to accommodate at least partially the least one pre-separator module; the at least one exchangeable filter element; or the least one pre-separator module and the at least one exchangeable filter element;

wherein the at least one mounting opening is surrounded by at least one cover receiving rim that extends across at least a portion of the adapter chamber;

wherein the housing main part comprises at or within the adapter chamber at least one part of a connecting device configured to connect the at least one pre-separator module to the housing main part;

wherein in at least one of a bottom wall and a side wall of the circumferential walls of the housing main part in an area delimiting the adapter chamber at least one optional passage is prepared for receiving at least one discharge opening of the at least one pre-separator module to project outwardly through a selected one the least one optional passage;

wherein media separated from the fluid by the at least one pre-separator module are discharged through the at least one discharge opening.

2. The housing main part according to claim 1, wherein the adapter chamber is configured to have a form and a size such that the adapter chamber at least partially accommodates at least a pre-separator housing of the at least one pre-separator module.

3. The housing main part according to claim 1, further comprising at least one intermediate cover wall delimiting circumferentially the adapter chamber on a side of the housing main part where the at least one mounting opening is located, wherein the at least one intermediate cover wall extends into an area delimited by the at least one cover receiving rim.

4. The housing main part according to claim 1, wherein the at least one part of the connecting device is a first connecting flange configured to connect the at least one pre-separator module to the housing main part.

5. The housing main part according to claim 4, wherein the at least one pre-separator module comprises
a second connecting flange and
the first connecting flange is configured to connect to the second connecting flange.

6. The housing main part according to claim 1, wherein the adapter chamber is cylindrical and
a cylinder axis of the adapter chamber extends parallel or axial relative to the main flow axis.

7. The housing main part according to claim 6, wherein the adapter chamber has an approximately square or rectangular cross-section.

8. The housing main part according to claim 6, wherein the at least one pre-separator module is cylindrical and
a cylinder axis of the at least one pre-separator extends parallel or axial relative to the main flow axis.

9. The housing main part according to claim 8, wherein the at least one pre-separator module comprises a pre-separator housing and
the pre-separator housing is cylindrical.

* * * * *